(12) United States Patent  
Mack et al.

(10) Patent No.: US 10,250,147 B2  
(45) Date of Patent: Apr. 2, 2019

(54) SWITCHED-MODE POWER SUPPLY AND METHOD FOR OPERATING A SWITCHED-MODE POWER SUPPLY

(71) Applicant: Robert Bosch GmbH, Stuttgart (DE)

(72) Inventors: Juergen Mack, Goeppingen (DE); Marc-Alexandre Seibert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/925,413

(22) Filed: Mar. 19, 2018

(65) Prior Publication Data  
US 2018/0278164 A1   Sep. 27, 2018

(30) Foreign Application Priority Data  
Mar. 21, 2017   (DE) .................. 10 2017 204 693

(51) Int. Cl.  
*H02M 3/335*   (2006.01)  
*H02M 1/32*   (2007.01)  
*H02M 1/42*   (2007.01)  
*H02M 3/338*   (2006.01)  
*H02M 1/00*   (2006.01)

(52) U.S. Cl.  
CPC ......... *H02M 3/33507* (2013.01); *H02M 1/32* (2013.01); *H02M 1/4241* (2013.01); *H02M 3/3385* (2013.01); *H02M 2001/0032* (2013.01)

(58) Field of Classification Search  
CPC .. H02M 3/33507; H02M 3/3385; H02M 1/32; H02M 1/4241; H02M 2001/0032  
See application file for complete search history.

(56) References Cited

U.S. PATENT DOCUMENTS

| | | | |
|---|---|---|---|
| 2014/0132228 A1* | 5/2014 | Lin .................. | H02M 1/32 323/207 |
| 2015/0098254 A1* | 4/2015 | Brinlee .............. | H02M 3/3376 363/21.02 |
| 2016/0094131 A1* | 3/2016 | Baurle .............. | H02M 3/33507 363/21.17 |

FOREIGN PATENT DOCUMENTS

WO   2004027963 A1   4/2004

* cited by examiner

*Primary Examiner* — Jue Zhang  
(74) *Attorney, Agent, or Firm* — Norton Rose Fulbright US LLP; Gerard Messina

(57) ABSTRACT

A switch-mode power supply includes a control element in a primary circuit for controlling a transformer for transmitting electric energy from the primary circuit to a secondary circuit, a first regulating element in the secondary circuit for regulating an electric output variable of the secondary circuit, and a second regulating element in the primary circuit for regulating an electric controlled variable of the control element as a function of a temperature of the primary circuit, the second regulating element being thermally coupled to an element of the primary circuit whose temperature is to be ascertained.

10 Claims, 3 Drawing Sheets

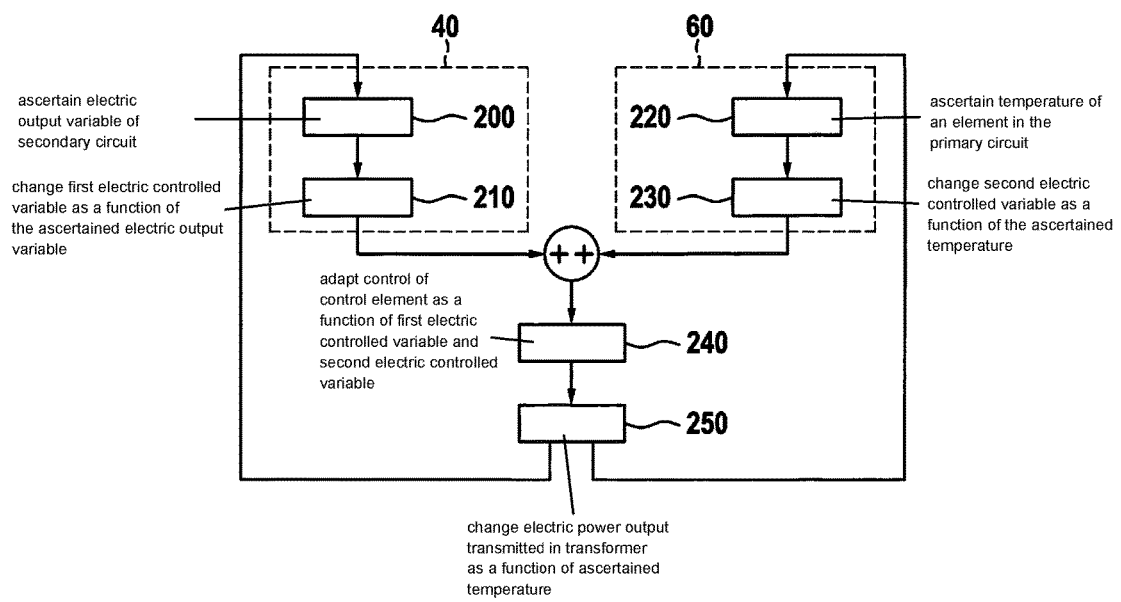

SWITCHED-MODE POWER SUPPLY AND METHOD FOR OPERATING A SWITCHED-MODE POWER SUPPLY

CROSS-REFERENCE TO RELATED APPLICATIONS

The present application claims priority under 35 U.S.C. § 119 to DE 10 2017 204 693.7, filed in the Federal Republic of Germany on Mar. 21, 2017, the content of which is hereby incorporated by reference herein in its entirety.

FIELD OF THE INVENTION

The present invention relates to a switched-mode power supply and to a method for operating a switched-mode power supply.

BACKGROUND

Known switched-mode power supplies are made up of a primary side (AC input) and a secondary side (DC output), which is galvanically separated from the primary side.

Switched-mode power supplies have a control loop on the secondary side. The control loop ascertains the electric output voltage and the electric output current and compares these with the respective setpoint values. A signal resulting from this comparison controls an optocoupler. Said optocoupler transmits the signal to the primary side in that it draws or modifies a primary regulating current as a function of the secondary signal.

Additionally, in switched-mode power supplies with higher power output, usually the temperature is detected on the secondary side via an NTC thermistor so that in the event of an increased temperature (e.g., because of an increased ambient temperature or because the active cooling (ventilator) has failed), the power output is reduced by reducing the setpoint values (so-called "derating").

Integrated switching controllers, which can be used on the primary side, often offer a function that switches off the switched-mode power supply completely in the event of an abnormal overtemperature (so-called latch). This can also be done via a bimetal switch. A complete switch-off is often not desirable, however, and moreover bimetal switches are usually expensive. WO 2004/027963 A1 discloses a switched-mode power supply, in which a control system is provided, in which a thermal model is implemented, with the aid of which it is possible to calculate or estimate the temperature of at least one component, the thermal model being provided with at least one load-dependent current value as electric variable. The control system is designed to output at least one limiting signal as a function of calculated or estimated temperature values when reaching specifiable limiting values or a function of multiple limiting values, which is usable in the sense of an intervention for temperature reduction. For this purpose, it is possible to supply the control system with a limiting signal, which acts on the control circuit in the sense of a temperature reduction and thereby a power output reduction.

SUMMARY

An objective of the present invention is to provide an improved switched-mode power supply.

According to a first aspect, the objective is achieved by a switched-mode power supply that includes: a control element situated in a primary circuit for controlling a transformer by way of an electric controlled variable; a first regulating element situated in a secondary circuit, which is functionally connected with the control element, the first regulating element being designed for regulating an electric output variable of the secondary circuit; and a second regulating element situated in the primary circuit for regulating the electric controlled variable of the control element as a function of a temperature of an element of the primary circuit ascertained by the second regulating element.

In this manner, it is advantageously possible to monitor a specifiable temperature threshold on the primary side of the switched-mode power supply. It is advantageously possible to equip or retrofit the switched-mode power supply with the second regulating element. This makes it possible to ensure in a simple and cost-effective manner that the switched-mode power supply conforms to norms and standards regarding technical safety.

In particular, a measure is thereby advantageously implemented in a simple manner, by which a multi-sided temperature regulation of a switched-mode power supply can be performed. In this manner, it is advantageously possible to implement a step by step adaptation of a power output of the switched-mode power supply without having to implement a hard cut-off. Existing switched-mode power supplies can be advantageously retrofitted with the second regulating element.

According to a second aspect, the objective is achieved by a method for operating a switched-mode power supply, the method including: a) ascertaining an electric output variable of a secondary circuit of the switched-mode power supply; b) changing a first electric controlled variable as a function of the ascertained electric output variable; c) ascertaining a temperature of an element in the primary circuit; d) changing a second electric controlled variable as a function of the ascertained temperature in the primary circuit; e) adapting the control of a control element as a function of a sum of the first electric controlled variable and the second electric controlled variable; and f) changing the electric power output that is transmitted in the transformer as a function of the ascertained temperature of the element of the primary circuit, steps a and b being performed in succession, steps c and d being performed in succession, and the pair of steps a and b being performed simultaneously with the performance of the pair of steps c and d.

According to an example advantageous development of the switched-mode power supply, the electric controlled variable is an electric current or an electric voltage or a digital variable. In this manner, different control concepts can be implemented for the control element.

According to an example advantageous development of the switched-mode power supply, a switching frequency of one or multiple switches of the control element is adjustable for the electric controlled variable of the control element. This advantageously makes it possible to implement a control concept for the control element that is easily modifiable.

According to an example advantageous development of the switched-mode power supply, the second regulating element is developed to influence the electric controlled variable of the control element in such a way that a specifiable temperature threshold value for the element of the primary circuit is not exceeded. This makes it possible to regulate the power output generated by the primary circuit, which advantageously makes it possible to monitor temperature limits on the primary side.

According to an example advantageous development of the switched-mode power supply, the second regulating element is a resistor. This makes it possible to implement for the switched-mode power supply a cost-effective temperature-ascertaining regulating element.

According to an example embodiment, the resistor is an NTC thermistor, which is interconnected in the primary circuit in such a way that it provides an electric regulating current in a suitable control direction. Advantageously, this makes it possible to provide a cost-effective regulating element, which has a "correct" control direction, an electric resistance of the NTC thermistor becoming smaller and an electric current becoming greater with rising temperature.

According to another example embodiment, the resistor is a PTC thermistor, which is interconnected with the primary circuit in such a way that it provides an electric regulating current in a suitable control direction. In this manner, an alternative, cost-effective regulating element is provided, which can be used to implement an alternative regulating concept, the PTC thermistor providing the electric regulating current in a suitable, i.e., "correct," control direction.

According to an example advantageous development of the switched-mode power supply, the switched-mode power supply is a resonance converter. In such switched-mode power supplies, the temperature on the primary side of the transformer is particularly critical, an effective temperature monitoring being thereby provided for these types of switched-mode power supplies.

The present invention is described below in detail with additional features and advantages with reference to several figures. In this connection, all disclosed features are the subject matter of the present invention, irrespective of their representation in the specification and in the figures, and irrespective of their antecedent reference in the patent claims. The figures are specifically intended to illustrate the principles that are essential to the present invention.

Disclosed method features result analogously from corresponding disclosed device features and vice versa. This means in particular that features, technical advantages and embodiments relating to the switched-mode power supply analogously result from corresponding embodiments, features and advantages of the method for operating a switched-mode power supply and vice versa.

BRIEF DESCRIPTION OF THE DRAWINGS

FIG. 3 is a flowchart illustrating a method according to an example embodiment of the present invention.

DETAILED DESCRIPTION

Example embodiments of the present invention provide a switched-mode power supply, which regulates a controlled variable for a transformer based on a temperature ascertained on the primary side.

In a known derating function, the temperature is detected only on the secondary side of the switched-mode power supply. This means that in the case of monitoring a temperature on the primary side (e.g., a primary side of the transformer, cooling body, switch element, etc.), a precise derating function or ascertainment of the temperature (reduction of the power output without switching the switched-mode power supply off completely) is not possible.

If this known derating function, however, is implemented via the imprecise secondary temperature measurement, then this may have the following disadvantageous effects. If the derating function reduces the power output insufficiently, the components on the primary side may overheat, resulting in a reduced service life or a non-fulfillment of safety standards, etc. Additionally, if the derating function reduces the electric power output too much, the switched-mode power supply is unable to supply the full possible electric power output, even if the temperature is still within the normal range. Ultimately, this means performance losses of the switched-mode power supply.

The two mentioned problems are particularly pronounced in charging devices, in which the electric charging current is regulated on the secondary side and in which thus the temperature of the secondary side varies little. The mentioned problems are even more pronounced if the switched-mode power supply is a resonance converter (e.g., an LLC converter), in which the temperature of the primary side varies greatly with the AC line voltage.

A regulating element is therefore provided having the functionality of a temperature-measuring element, which is thermally coupled to an element of the primary side, the temperature of which is to be monitored, and which influences an electric control element on the primary side.

Figure 1:
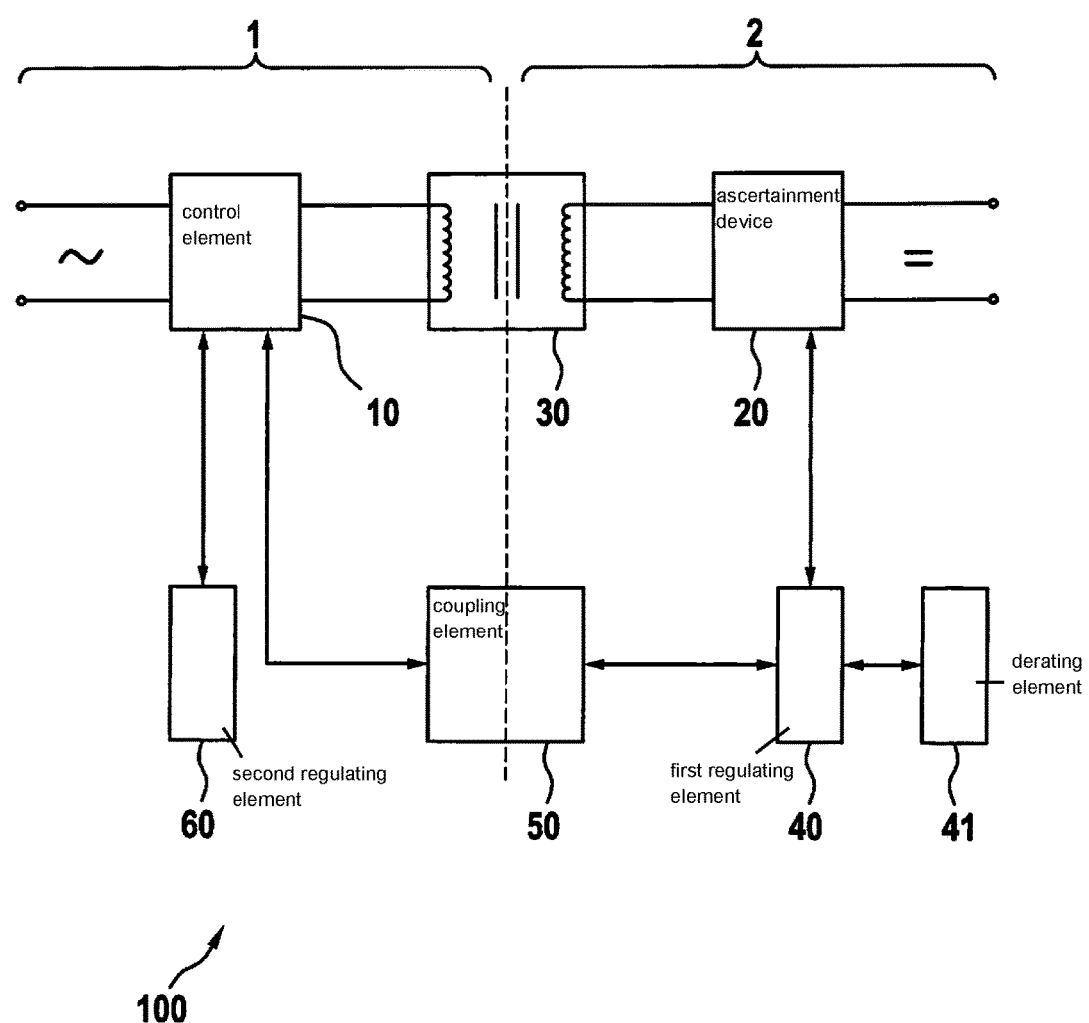
FIG. 1 is a block diagram of a provided switched-mode power supply according to an example embodiment of the present invention.

This can be seen in principle in the representation of a provided switched-mode power supply 100 in FIG. 1. Using a control element 10 of a primary circuit 1, an electric signal is generated, which controls a transformer 30 that transmits electric power from primary circuit 1 to secondary circuit 2. In secondary circuit 2 of switched-mode power supply 100, an ascertainment device 20 ascertains an electric output variable (e.g., the electric current and/or the electric voltage on the output of secondary circuit 2). With the aid of a first regulating element 40, which is functionally connected to ascertainment device 20, the ascertained electric variable is transmitted via a coupling element 50 (e.g., an octocoupler), which is interconnected between primary circuit 1 and secondary circuit 2, to control element 10 of primary circuit 1. A derating element 41 is interconnected with regulating element 40, which performs the derating function explained above.

Coupling element 50 is functionally connected to control element 10, which by way of first regulating element 40 produces a first control loop, which regulates an electric controlled variable for the control element 10 as a function of an electric output variable on secondary circuit 2.

A second regulating element 60 is thermally coupled to an element (not shown) of primary circuit 1 whose temperature is to be monitored and also to connect second regulating element 60 functionally to control element 10. In this manner, second regulating element 60 is used to produce a second control loop, which regulates a electric controlled variable for control element 10 as a function of the temperature of the element of primary circuit 1.

Figure 2:
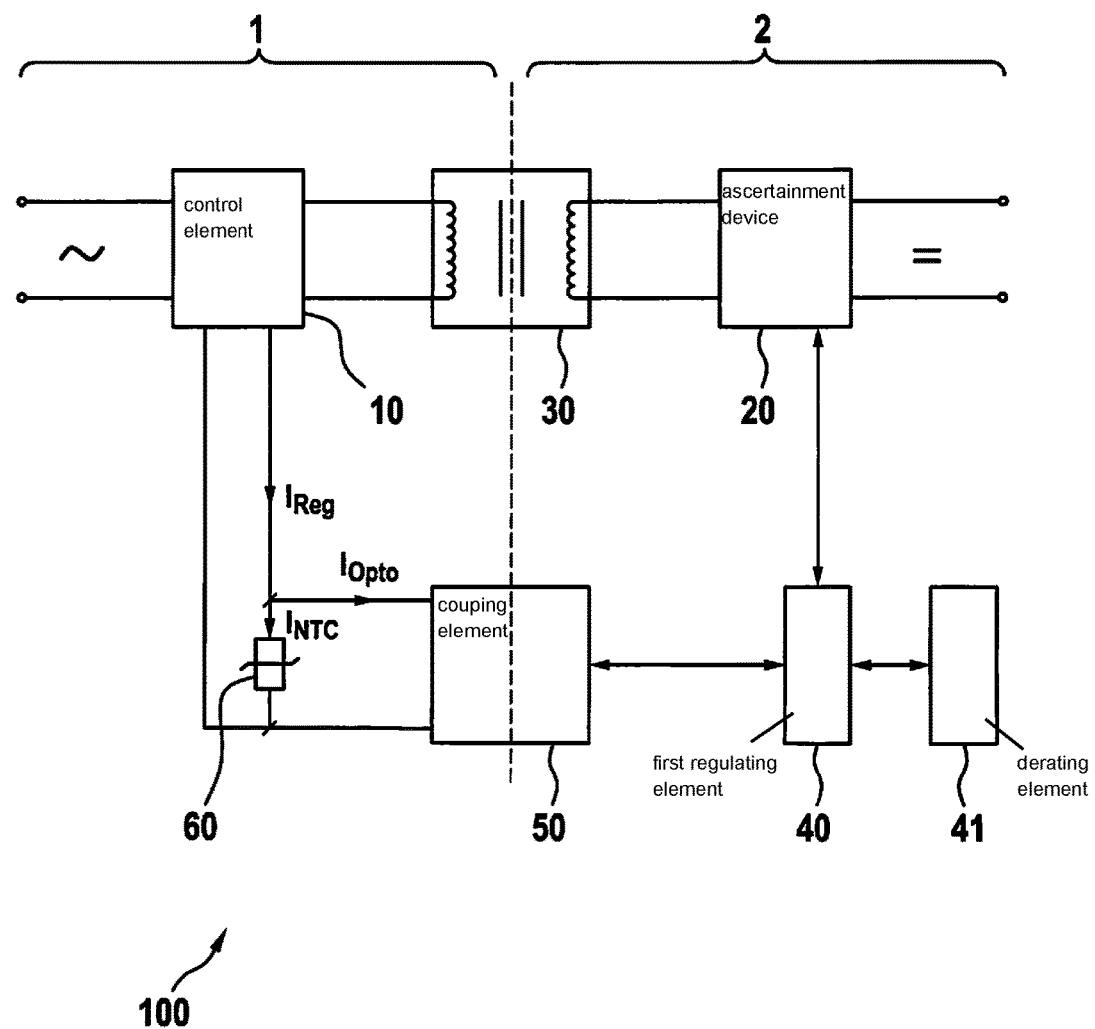
FIG. 2 is a block diagram of a switched-mode power supply according to another example embodiment of the present invention.

FIG. 2 shows a further possible example embodiment of the provided switched-mode power supply 100, in which the second regulating element 60, in the form of an NTC thermistor, is connected in parallel to coupling element 50. The NTC thermistor has a negative temperature coefficient, which means that with rising temperature the resistance decreases and as a result the electric current $I_{NTC}$ through the NTC resistor increases.

Ultimately, with rising temperature of the second regulating element 60 in the form of an NTC thermistor, an electric current $I_{Reg}$ for control element 10 is increased, as a result of which the electric power output generated by transformer 30 is reduced. In the end, the electric power transmitted via transformer 30 at increased temperature is thereby reduced again, which ultimately lowers the temperature in primary circuit 1 and thus also of the element of primary circuit 1 whose temperature is ascertained.

By way of the NTC thermistor in primary circuit 1, it is thus advantageously possible to ascertain the temperature of primary circuit 1 very precisely. It is advantageously possible to position the NTC thermistor in a simple manner on any element whose temperature is to be ascertained, for example on a cooling body, a component, an element of transformer 30 etc. The NTC thermistor in this instance acts like an additional temperature control loop, which acts in addition to the control loop implemented in the first regulating element 40. Here too, a derating element 41 is interconnected with regulating element 40, which helps perform the derating function explained previously.

FIG. 2 shows that an NTC thermistor is interconnected parallel to the primary side of coupling element 50 in the form of the optocoupler. An electric current $I_{NTC}$ flows through the NTC thermistor which is added to the electric coupler current $I_{Opto}$ that flows through the optocoupler. This electric current increases with the primary temperature in accordance with the reduction of the resistance of the NTC thermistor.

The total regulating current $I_{Reg}$ is therefore increased by a temperature-dependent component, whereby, at an excessively high temperature, the maximum available electric power is reduced (derating function). At normal temperature, this component is so low that the secondary control loop including first regulating element 40 is able to compensate for it and that the electric power output of switched-mode power supply 100 is thus not reduced.

Using a single NTC thermistor, it is thus possible in a simple manner to implement an additional primary derating function for an already existing control loop for switched-mode power supply 100. At increased temperature, the power output is thus reduced (derating), the control element 10, however, advantageously not latching, i.e., completely switching off, the switched-mode power supply 100. As a result, advantageously, a basic functionality is preserved for switched-mode power supply 100 at a reduced level. For a battery charger, this means for example that the electric charging function is not completely shut off, but that merely e.g., the electric charging current is reduced.

Another example embodiment of the provided switched-mode power supply 100, which is not shown in the figures, provides for the second regulating element 60 to be a PTC thermistor, which is interconnected in primary circuit 1 in such a way that it provides the electric regulating current $I_{Reg}$ in the "correct" control direction. A PCT thermistor can be used as regulating element 60, for example, in the event that the control direction in the switched-mode power supply is reversed (regulating current $I_{Reg}$ diminishes in order to reduce the power output). In this manner, an alternative additional control loop is provided using the PTC thermistor.

Another example embodiment of the switched-mode power supply 100, which is not shown in the figures, provides for the electric controlled variable to be a digital controlled variable for control element 10, for example a control signal for control element 10 having an adjustable relationship between turn-on time and turn-off time as a function of the ascertained temperature. For this purpose, the second regulating element 60 is preferably developed as an electronic circuit (not shown), which provides the mentioned function.

The provided switched-mode power supply 100 is preferably a resonance converter, in which the temperature monitoring of the primary circuit has a high priority. In this manner, it is advantageously possible to achieve a maintenance and/or monitoring of technical safety standards and/or norms.

FIG. 3 is a flowchart of an example embodiment of a method of the present invention. In a step 200, an electric output variable of a secondary circuit 2 of switched-mode power supply 100 is ascertained. In a step 210, a first electric controlled variable $I_{Opto}$ is changed as a function of the ascertained electric output variable. In a step 220, a temperature of an element in the primary circuit 1 is ascertained. In a step 230, a second electric controlled variable $I_{NTC}$ is changed as a function of the ascertained temperature in primary circuit 1. In a step 240, the control of a control element 10 is adapted as a function of a sum of first electric controlled variable $I_{Opto}$ and of second electric controlled variable $I_{NTC}$. In a step 250, the electric power output that is transmitted in transformer 30 is changed as a function of the ascertained temperature of the element of primary circuit 1, steps 200 and 210 being performed in succession, steps 220 and 230 being performed in succession, and steps 200 and 210 being performed simultaneously with performance of steps 220 and 230. Steps 200, 210 are performed using a first regulating element 40, and steps 220, 230 are performed using a second regulating element 60.

First electric controlled variable (step 210) is an electric controlled variable that is changed as a function of the ascertained electric output variable (step 200) and with the aid of coupling element 50.

In the example embodiment of the switched-mode power supply 100, as shown in FIG. 2, it is the current $I_{Opto}$ that is changed by the optocoupler. The optocoupler changes this current $I_{Opto}$ as a function of the signal that is produced by regulating element 40 on the secondary side.

Second electric controlled variable (step 230) is an electric controlled variable that is changed as a function of the ascertained temperature on the primary side (step 220).

In the example embodiment of switched-mode power supply 100 from FIG. 2, it is current $I_{NTC}$ that is changed by the NTC thermistor (the resistance value of the NTC thermistor changes with the temperature and thus this current $I_{NTC}$ is changed).

FIG. 2 shows that these two electric controlled variables are added together. This yields a current $I_{Reg}$ ($I_{Reg}=I_{Opto}+I_{NTC}$) as a function of which the control of control element 10 is adapted (step 240).

In summary, the present invention provides a switched-mode power supply having a primary-side temperature regulation in addition to a secondary-side regulation.

Although the present invention was described above with reference to concrete examples of use, one skilled in the art is also able to implement embodiments that were not disclosed above or that were disclosed above only partially, without deviating from the essence of the invention.

What is claimed is:

1. A switch-mode power supply, having:
   a control element situated in a primary circuit for controlling a transformer with the aid of an electric controlled variable;
   an ascertainment device that is situated in a secondary circuit for ascertaining an electric output variable of the secondary circuit;
   a first regulating element that is situated in the secondary circuit, functionally connected with the control element, and configured to regulate the electric output variable of the secondary circuit;

a coupling element, interconnected between the primary circuit and the secondary circuit, functionally connecting the ascertainment device with the control element for transmitting the ascertained electric output variable of the secondary circuit to the control element of the first circuit; and a second regulating element that is situated in the primary circuit for regulating the electric controlled variable of the control element as a function of a temperature of an element of the primary circuit ascertained by the second regulating element, wherein the second regulating element is connected in parallel to the coupling element.

2. The switched-mode power supply of claim 1, wherein the electric controlled variable is an electric current, an electric voltage, or a digital variable.

3. The switched-mode power supply of claim 2, wherein a switching rate of one or more switches of the control element for the electric controlled variable of the control element is adjustable.

4. The switched-mode power supply of claim 1, wherein the second regulating element is configured to influence the electric controlled variable of the control element to ensure that a specifiable temperature threshold value for the element of the primary circuit is not exceeded.

5. The switched-mode power supply of claim 1, wherein the second regulating element is a resistor.

6. The switched-mode power supply of claim 5, wherein the resistor is an NTC thermistor interconnected in the primary circuit in such a way that it provides an electric regulating current in a control direction.

7. The switched-mode power supply of claim 5, wherein the resistor is a PTC thermistor interconnected in the primary circuit in such a way that it provides an electric regulating current in a control direction.

8. The switched-mode power supply of claim 1, wherein the switched-mode power supply is a resonance converter.

9. A method for operating a switched-mode power supply, the method comprising:
   a. ascertaining an electric output variable of a secondary circuit of the switched-mode power supply;
   b. changing a first electric controlled variable based on the ascertained electric output variable;
   c. ascertaining a temperature of an element in a primary circuit of the switched-mode power supply;
   d. changing a second electric controlled variable based on the ascertained temperature in the primary circuit;
   e. adapting a control by a control element based on a sum of the first electric controlled variable and the second electric controlled variable; and
   f. changing an electric power output that is transmitted in a transformer based on the ascertained temperature of the element of the primary circuit;
   wherein steps a and b are performed in succession, steps c and d are performed in succession, and the performance of the pair of steps of a and b is simultaneous to the performance of the pair of steps of c and d.

10. The method of claim 9, wherein the adapting of the control by the control element is performed in a manner by which electric power transmitted from the primary circuit to the secondary circuit is reduced when the temperature of the element in the primary circuit exceeds a predefined threshold value.

* * * * *